(12) United States Patent
Uraizee et al.

(10) Patent No.: US 9,832,149 B2
(45) Date of Patent: Nov. 28, 2017

(54) TREATMENT OF CLOUD-BASED AND LOCAL ATTACHMENTS IN COMMUNICATION APPLICATIONS

(71) Applicant: Microsoft Technology Licensing, LLC, Redmond, WA (US)

(72) Inventors: Misbah Uraizee, Bellevue, WA (US); Chris Walker, Kirkland, WA (US); Steven Lepofsky, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 304 days.

(21) Appl. No.: 14/571,948

(22) Filed: Dec. 16, 2014

(65) Prior Publication Data

US 2016/0094499 A1 Mar. 31, 2016

Related U.S. Application Data

(60) Provisional application No. 62/057,643, filed on Sep. 30, 2014.

(51) Int. Cl.
*G06F 17/30* (2006.01)
*H04L 12/58* (2006.01)
(Continued)

(52) U.S. Cl.
CPC ............ *H04L 51/08* (2013.01); *G06F 3/0482* (2013.01); *G06F 17/30126* (2013.01); *G06Q 10/107* (2013.01)

(58) Field of Classification Search
USPC ....... 715/764, 201, 205, 209, 717, 733, 738, 715/739, 748, 752, 765, 769; 709/206
See application file for complete search history.

(56) References Cited

U.S. PATENT DOCUMENTS 7,412,447 B2 8/2008 Hilbert et al.
8,037,137 B2 10/2011 Keohane et al.
(Continued)

OTHER PUBLICATIONS

Maggiani R. "Cloud computing is changing how we communicate." InProfessional communication conference, 2009. IPCC 2009. IEEE international Jul. 19, 2009 (pp. 1-4). IEEE.*
(Continued)

*Primary Examiner* — Doon Chow
*Assistant Examiner* — Wendy Nicholas
(74) *Attorney, Agent, or Firm* — Turk IP Law, LLC

(57) ABSTRACT

Users of communication applications may be enabled to select from a user-friendly and efficiently provided list of files that may be of interest to them to attach to a correspondence and send to one or more recipients. For example, the communication application may retrieve information from one or more application programming interfaces (APIs) associated with applications of the user to determine the list of files. The files may be local files or cloud-based files, and a variety of criteria may be used to determine, group, and present the files to the user for selection. Once selected by the user, the files or links to cloud destinations of the files may be attached to the correspondence, where the files or links may be displayed in an attachment well or a body of the correspondence. Permissions associated with the attachments may be set by default, by user configuration, and/or modified by user.

18 Claims, 13 Drawing Sheets

(51) Int. Cl.
*G06F 3/0482* (2013.01)
*G06Q 10/10* (2012.01)

(56) References Cited

U.S. PATENT DOCUMENTS

| | | | |
|---|---|---|---|
| 8,600,970 B2 | 12/2013 | Abbott et al. | |
| 9,455,939 B2* | 9/2016 | Meisels | G06Q 10/107 |
| 2007/0271344 A1* | 11/2007 | Danasekaran | G06Q 10/10 |
| | | | 709/206 |
| 2008/0005685 A1 | 1/2008 | Drews et al. | |
| 2009/0094335 A1* | 4/2009 | Edmonds | G06F 15/16 |
| | | | 709/206 |
| 2009/0144283 A1* | 6/2009 | Clark | G06F 17/30144 |
| 2009/0198779 A1* | 8/2009 | Agrawal | H04L 51/063 |
| | | | 709/206 |
| 2012/0233130 A1 | 9/2012 | Vedachalam et al. | |
| 2012/0265817 A1 | 10/2012 | Vidalenc et al. | |
| 2012/0278404 A1* | 11/2012 | Meisels | G06Q 10/107 |
| | | | 709/206 |
| 2012/0278406 A1* | 11/2012 | Meisels | H04L 51/08 |
| | | | 709/206 |
| 2012/0284345 A1* | 11/2012 | Costenaro | G06Q 10/107 |
| | | | 709/206 |
| 2012/0323935 A1 | 12/2012 | Evans et al. | |
| 2013/0067594 A1 | 3/2013 | Kantor et al. | |
| 2013/0080545 A1* | 3/2013 | Datta | G06Q 10/107 |
| | | | 709/206 |
| 2013/0111404 A1 | 5/2013 | Yang et al. | |
| 2013/0262537 A1* | 10/2013 | Srikrishna | G06F 17/30011 |
| | | | 707/827 |
| 2014/0025712 A1 | 1/2014 | Chisa et al. | |
| 2014/0149592 A1* | 5/2014 | Krishna | G06F 1/329 |
| | | | 709/226 |
| 2014/0207891 A1 | 7/2014 | Edelstein et al. | |
| 2015/0200884 A1* | 7/2015 | Fioravanti | H04L 51/08 |
| | | | 709/206 |
| 2015/0200885 A1* | 7/2015 | Sharp | H04L 51/08 |
| | | | 709/206 |
| 2015/0264111 A1* | 9/2015 | Aleksandrov | H04L 67/2823 |
| | | | 726/4 |
| 2015/0326517 A1* | 11/2015 | Block | H04L 51/08 |
| | | | 726/7 |
| 2015/0350133 A1* | 12/2015 | Murphy | H04L 67/42 |
| | | | 709/203 |

OTHER PUBLICATIONS

"Second Written Opinion Issued in PCT Application No. PCT/US2015/052766", dated May 23, 2016, 7 Pages.
"MetisMe Attachments Management", Published on: Nov. 9, 2013, Available at: https://chrome.google.com/webstore/detail/metisme-attachments-manag/ngimbpnoapepdadjidgcdaiijfedckid?hl=en.
"Cloud Attach for Gmail™ by ZeroPC", Retrieved on: Oct. 1, 2014, Available at: https://chrome.google.com/webstore/detail/cloud-attach-for-gmail-by/milgdagkgnjgifepimndleebjabnnadl?hl=en.
Ak, Sofia, "Attach Cloud Files into Gmail (On the Fly) With Cloudy", Published on: Feb. 22, 2013, Available at: http://www.hongkiat.com/blog/attach-cloud-files-gmail/.
Messieh, Nancy, "How to Attach Files From the Cloud to Gmail in Chrome", Published on: Feb. 19, 2013, Available at: http://www.makeuseof.com/tag/how-to-attach-files-from-the-cloud-to-gmail-directly/.
"Microsoft Office for iPad", Retrieved on: Oct. 1, 2014, Available at: http://news.microsoft.com/download/presskits/office/docs/officeipadrg.pdf.
"OfficeSuite 7 + PDF to Word", Published on: Sep. 9, 2014, Available at: https://play.google.com/store/apps/details?id=com.mobisystems.office&hl=en.
U.S. Appl. No. 14/079,137, Meyers, et al., "Process of Sharing a Document Link via Email", filed Nov. 13, 2013.
"International Search Report & Written Opinion Issued in PCT Application No. PCT/US2015/052766", dated Dec. 23, 2015, 10 Pages.
"International Preliminary Report on Patentability Issued in PCT Application No. PCT/US2015/052766", dated Oct. 6, 2016, 7 Pages.

* cited by examiner

TREATMENT OF CLOUD-BASED AND LOCAL ATTACHMENTS IN COMMUNICATION APPLICATIONS

CROSS-REFERENCE TO RELATED APPLICATIONS

This Application claims the benefit under 35 U.S.C §119 (e) of U.S. Provisional Application Ser. No. 62/057,643 filed on Sep. 30, 2014. The Provisional Application is herein incorporated by reference in its entirety.

BACKGROUND

Communication applications, such as email applications, allow users to share files by attaching them to a correspondence. However, the attachment process is typically a mechanical and limited process, where the user is given an option to browse through their computer and select a file to attach without providing any contextual information about the file, let alone any automatic suggestions based on contextual information. Furthermore, conventional systems are limited to attachment of local or network drive stored files, and every recipient intended to receive the correspondence may also receive the attachment regardless of whether the recipient has previously received the files. Moreover, the attachment process does not allow a user to configure permissions or set permissions based on other rules. Finally, conventional attachment processes are typically menu based and are not optimized for touch or gesture input mechanisms.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to treatment of cloud-based and local attachments in a communication application, which may include detecting a user intent to attach a file to a correspondence, determining a list of local and cloud-based files of interest to the user, presenting the list of the local and cloud-based files to the user for selection, and upon selection of one or more files from the list, attaching one of the selected files or links to locations of the selected files to the correspondence.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
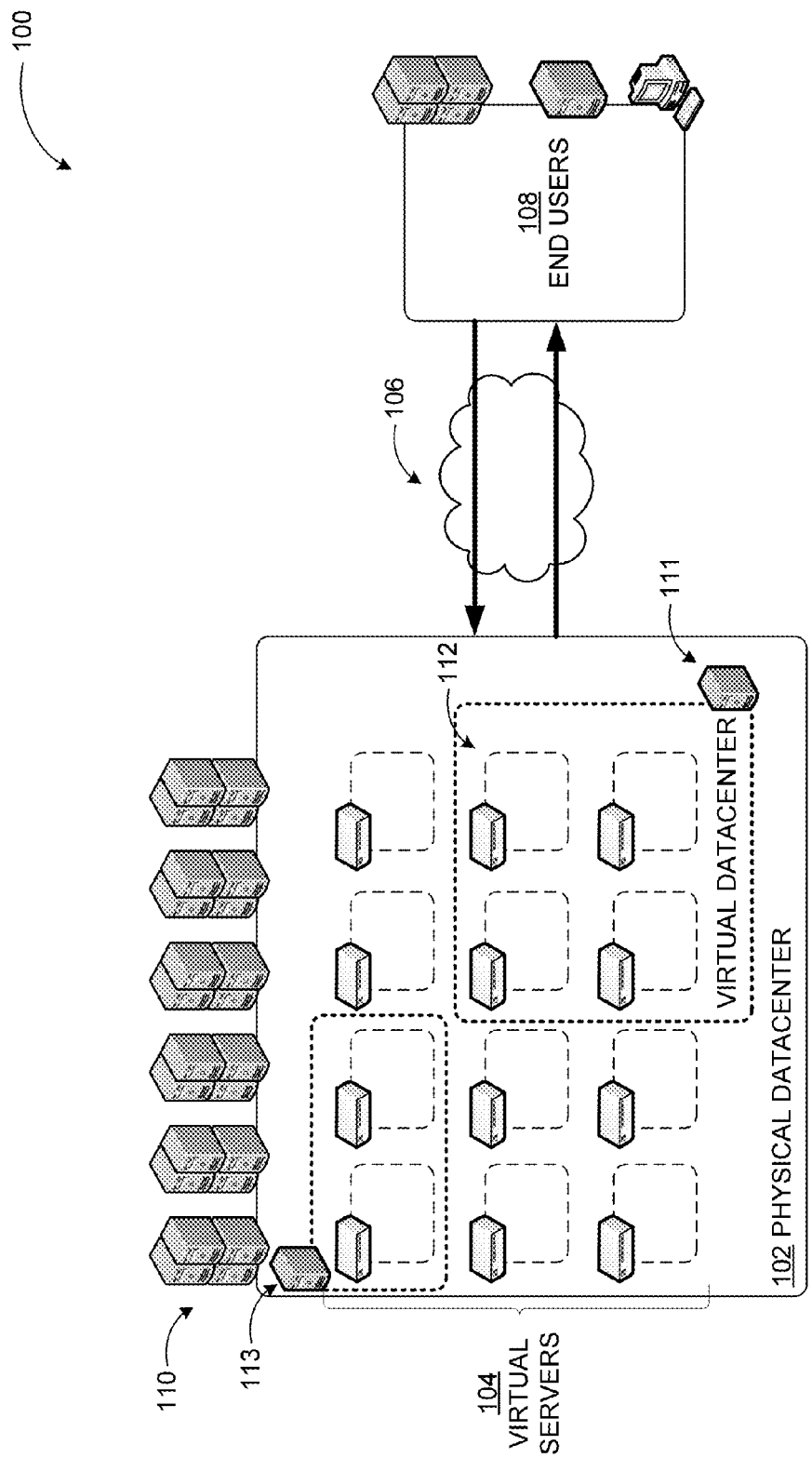
FIG. 1 includes a conceptual diagram illustrating an example datacenter-based system where treatment of cloud-based and local attachments in a communication application may be implemented.

As briefly described above, in response to detecting a user intent to attach one or more files to a correspondence, a communication application may be configured to determine and provide the user with a list of files that may be of interest to them to attach to the correspondence and send to other users. For example, the communication application may retrieve information from one or more application programming interfaces (APIs) associated with applications of the user to determine the list of files, where the files may be locally stored files at a computing device associated with the user, files stored at a network drive associated with the user, files from a social network, files from a professional network, files from a collaboration service to which the user subscribes, and cloud-based files of other users. A variety of criteria may be used to determine, group, and present the files to the user for selection, such as whether the user has recently viewed, modified, saved, listened to, shared, pinned, or sent the files, and one or more of a recentness of user interaction with a file, a type of user interaction with the file, and a type of the file. Once selected by the user, files or links to locations of the files may be attached to the correspondence, where the files or links may be displayed in an attachment well or a body of the correspondence. Permissions associated with the attachments may be set by default, by user configuration, and/or modified by user, and may be enforced upon receipt of the attachment by a recipient.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for treatment of cloud-based and local attachments in a communication application. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes a conceptual diagram illustrating an example datacenter-based system where treatment of cloud-based and local attachments in a communication application may be implemented.

As shown in a diagram 100, a datacenter 102 may include one or more servers 110, 111, and 113 that are physical servers associated with software and underlying hardware of the datacenter 102. The one or more servers 110, 111, and 113 may be configured to execute one or more virtual servers 104. For example, the servers 111 and 113 may be configured to provide four virtual servers and two virtual servers, respectively. In some embodiments, one or more virtual servers may be combined into one or more virtual datacenters. For example, the four virtual servers provided by the servers 111 may be combined into a virtual datacenter 112. The virtual servers 104 and/or the virtual datacenter 112 may be configured to host a multitude of servers to provide cloud-related data/computing services such as various applications, data storage, data processing, or comparable ones to one or more end users 108, such as individual users or enterprise customers, via a cloud 106.

In an example embodiment, the datacenter 102 may be hosting a communication service configured to provide communication services to the end users 108 in various modalities such as email, text messaging, audio/video conferencing, application sharing, desktop sharing, and the like. Alternatively, a combination service may provide other services such as word processing, presentation, and spreadsheet processing, for example, in conjunction with the communication service. At least one server of the datacenter 102 hosting the communication service may be configured to execute a communication application, where the communication application may enable a sending user to send correspondence in one of the above-described modalities to recipients. For example, a user may send an email message to one or more recipients. The recipients may access the received email through thick or thin client applications. A recipient may use a locally installed communication application. Another recipient may use a client version of the communication application in conjunction with the server-side application. Yet another recipient may use a web browser to access the server-side application or a web application. Similarly, the sending user may also use any one of those alternative implementations of a communication application. Depending on which type of communication application the sending user and the recipients use and a developer of the application(s), each application may have the same or differing capabilities. For example, in one application an email message may present attachments in an attachment well and/or in the body of the email, while other email applications may be capable of presenting the attachments only in the body of the email. Email data such as sent emails, received emails, contacts, etc. may be stored in data stores associated with the communication service (e.g., managed by storage servers).

According to embodiments, treatment of cloud-based and local attachments in communication applications may enable an attachment module of a communication application to determine files of interest to a user and present a suggested file list for attachment to a correspondence that is being prepared in response to detecting a user intent to attach a file to the correspondence. Upon user selection of one or more files from the list, the attachment module may attach the selected files or links to locations of the selected files to the correspondence. The attachments may be displayed in an attachment well and/or within a body of the correspondence. The files of interest may be from a variety of sources such as files locally stored at the user's computing device, files stored at the user's network drive, files from social or professional networks, files from a collaboration service to which the user subscribes, and other cloud-based files such as files of other people that may be associated with the user. While email is used as the main example form of correspondence herein, embodiments are not limited to email attachments and may be implemented in other forms of correspondence such as text messaging, online conferencing, application sharing, desktop sharing, and comparable ones that allow users to share files. Furthermore, attachments may include any types of file including, but not limited to, text files, graphics files, audio files, video files, unstructured data files, structured data files, and comparable ones.

As previously discussed, existing approaches for the attachment of files to a correspondence may typically be a mechanical and limited process, where the user is given an option to browse through their computer and select a file to attach without providing any contextual information about the file. The approaches may further be limited to local or network drive stored files, and a user may be unable to configure permissions for the attachments or set them based on other rules. Furthermore, conventional attachment processes may be typically menu based and are not optimized for touch or gesture input mechanisms.

According to the above-described embodiments, treatment of cloud-based and local attachments in communication applications may simplify and increase efficiency of correspondence between users. For example, the smart suggestion of files to attach to a user may reduce user time, processor load, and memory load by reducing downloading of files from cloud-based data stores before sending, review of a variety of data sources by the sending user, and/or downloading of updated versions of attached documents by recipients. Furthermore, treatment of cloud-based and local attachments in communication applications may advantageously improve usability by enabling easier navigation on touch or gesture user experiences, no longer limiting attachment suggestions to the user's computing device, and by enabling user-based permissions to secure content of the attachments, among other examples.

Figure 2:
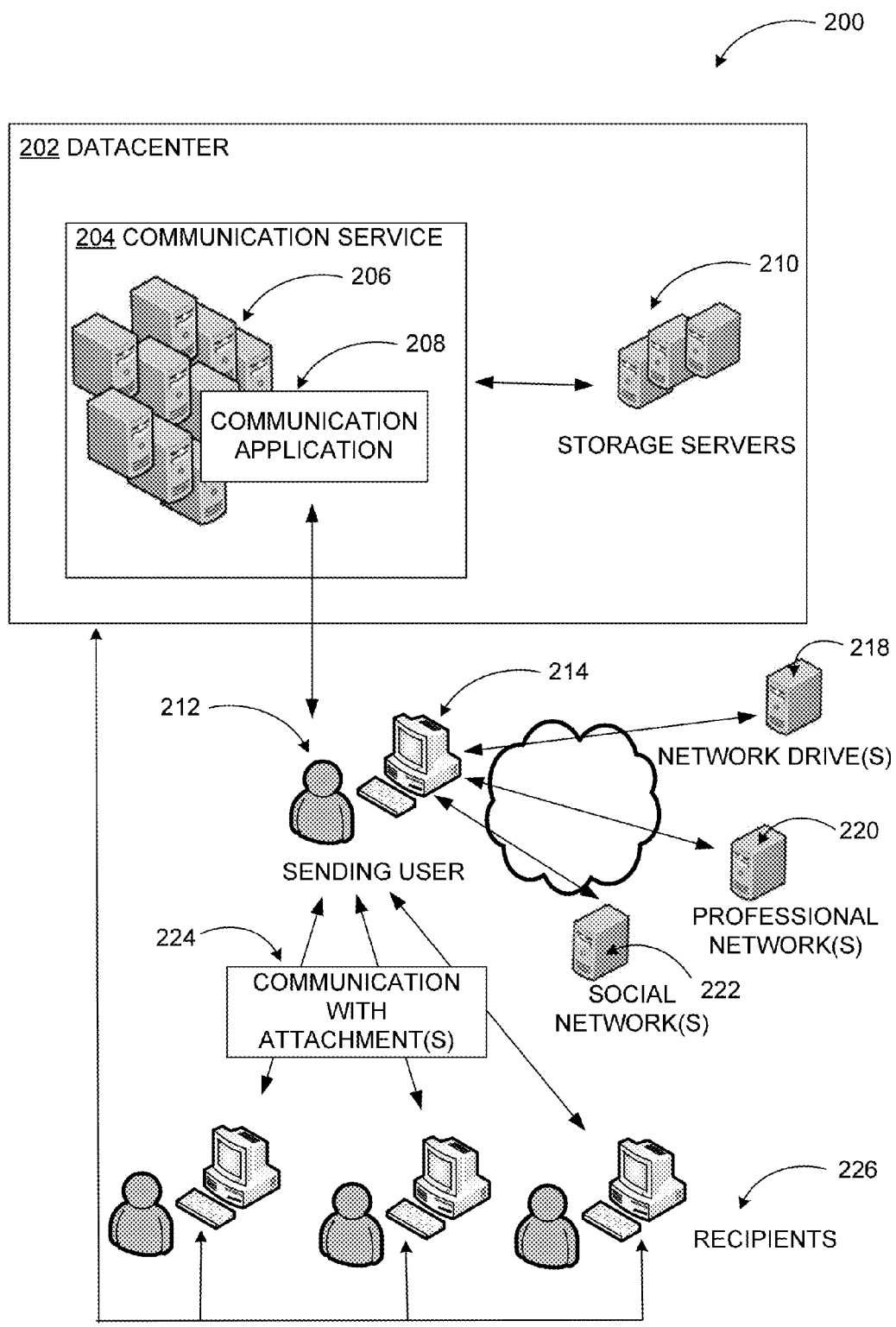
FIG. 2 includes a conceptual diagram illustrating an example architecture of a system, where treatment of cloud-based and local attachments in a communication application may be implemented.

FIG. 2 includes a conceptual diagram illustrating an example architecture of a system, where treatment of cloud-based and local attachments in a communication application may be implemented. As illustrated in diagram 200, an example system may include a datacenter 202 hosting a communication service configured to provide communication services to users in various modalities such as email, text messaging, audio/video conferencing, application sharing, desktop sharing, and the like. The datacenter 202 may include one or more processing servers 206, of which, at least one may be operable to execute a communication application 208. The datacenter 202 may also include one or more storage servers 210 configured to manage one or more data stores comprising data associated with the communication application 208.

In an example embodiment, the communication application 208 may enable a sending user 212 to send correspondence 224, which may include a communication with one or more attachments, in one of the above-described modalities to recipients 226. In response to detecting an intent of the user 212 to attach a file to the correspondence 224, an attachment module of the communication application 208 may be configured to determine files of interest to the sending user 212. The files of interest may be from a variety of sources such as files locally stored at the user's computing device 214, files stored at the user's network drive 218, files from social networks 222 or professional networks 220, files from a collaboration service to which the user subscribes, and other cloud-based files such as files of other people that may be associated with the sending user 212.

The attachment module of the communication application 208 may then present a suggested file list for attachment to the correspondence 224 to the sending user 212 through a user experience of the communication application 208 or through a separate user experience. In an example embodiment, the user experience may present a menu listing files of interest that the sending user 212 may wish to attach. For example, the menu may be a drop-down menu, pop-up menu, or other similar menu. If the sending user 212 wishes to attach a specific file not on the list, a browse selection may also be presented through the user experience. The source of the files on the list may be local or cloud based, files of the sending user 212 or files of other users, and/or public files. The files may be selected for presentation by the attachment module of the communication application 208 based on whether the sending user 212 has recently viewed, modified, saved, listened to (in case of audio files), shared, pinned, or sent the files. An order and/or a grouping of the files within the list may be based on the same criteria as well as a recentness of interaction, a type of interaction, and a type of file. The files may be further presented and/or grouped based on default rules, user configuration, and/or inference by the attachment module of the communication application 208. In some example implementations, a machine learning algorithm may be employed to determine files of interest to the sending user 212 (for example, files the user's team is working on, files that are of most interest to the user's peers/supervisors, etc.) and order/group those. Furthermore, files the sending user 212 has recently viewed, modified, and/or sent, for example, on different computing devices may be used in the pool of files to select from regardless of the computing device implementing cross-device support. Any graphical, textual, coloring, shading, or visual effect scheme may be used to present file types, sources, and reason for listing a file.

Once the sending user 212 selects one or more files from the list, the attachment module of the communication application 208 may attach the selected files or links to locations of the selected files to the correspondence 224. The attachments may include any types of file including, but not limited to, text files, graphics files, audio files, video files, unstructured data files, structured data files, and comparable ones. In some embodiments, the attachment module may attach a selected file itself or a link to its location based on a default rule, user configuration, or permission settings. The attachment may be shown in an attachment well or within the body of the email using a textual and/or graphical scheme. The scheme may include an icon and name, for example. Furthermore, links that are attached to the correspondence 224 may also be presented in the attachment well. The representation of the attachment may also indicate a type and/or a source of the file.

Some files, whether they are local or cloud-based may be associated with original permissions, which may be determined by the attachment module of the communication application 208. Thus, files or links to their location upon being attached to the email may also be associated with permissions for the recipients 226. Permissions may include, but are not limited to, view, edit, forward, not forward, save, and not save. The permissions for the attachment may be set to be the same as the original permissions for the source file or may be modified and/or set by the sending user 212. For example, the sending user 212 may customize a set of default permissions such that the sending user 212 does not have to manually set permissions each time they attach a file. Thus, the user experience may present the sending user 212 an option to set or modify permissions for a file about to be attached. Permissions may be enforced and persisted upon receipt of the correspondence 224 by the recipients 226. Alternatively, the recipients 226 may set their own permissions when forwarding the correspondence 224. However, the recipients 226 may only set the permissions to a same or a lower level than the previous permissions. For example, a file received by the recipients 226 that is marked as view-only may not be changed to edit-available and forwarded to another recipient by the recipients 226 of the correspondence 224.

In other embodiments, if an attachment is a cloud-based file that is being sent as a link, access to the file may be through the recipients' own credentials if the recipients 226 have access to a same cloud location/service associated with the attachment, or through a one-time guest access. In some examples, the attachment module communication application 208 may configure this access upon determining whether or not the recipients 226 have access to the cloud location/service associated with the attachment.

In further embodiments, local files may be uploaded to the cloud and sent as a cloud link attachment or cloud-based files may be downloaded and sent directly as actual files. This may be presented to the sending user 212 as a selection option or performed automatically based on default rules or user behavior based inference. In some embodiments, the local files may be uploaded asynchronously to the cloud. For example, to prevent reducing an amount of bandwidth available to users of the cloud, such as the sending user 212 and recipients 226, the local files may be uploaded during a quiet period associated with low data transmissions, such as in the middle of the night. Alternatively, the asynchronous upload may be configurable by the sending user 212. The attachment of different types of files may also be completely transparent to the sending user 212 such that the sending user 212 does not have to think about whether they are sending a local file directly or a link to a cloud-based file.

If the attachment is a cloud-based file, the recipients' client applications may be configured to download and present the latest version when the recipients 226 access the attachment depending on whether or not the recipients are online. If the recipients 226 are off-line, the version that was sent may be shown. If the recipients 226 are online, the attachment may be updated and shown. Furthermore, if the recipients 226 are online, they may not only receive a downloaded copy of the most recent version of the attached file, but they may have a version of the file which is continually updated in real time as both they and other users change the file (co-author), for example, if the file is hosted by a collaborative service. In some examples, the sending user 212 may decide not to download the file on receive time and instead send an attachment (local copy of the cloud file) of a cloud document with the appropriate meta information to connect into the synchronization engine of a document processing service, so that when the recipients 226 are online, the document processing service may check whether there are updates at the server and thus only show the latest version of the file to the sending user 212.

In some embodiments, the attachment module of the communication application 208 may treat a link inserted into the body of the email the same way as attaching a file and presenting it to the recipients 226, where the link refers to a cloud-based file. Thus, the attachment module of the communication application 208 may detect the link as belonging to a cloud-based file and perform the same process as attachment of local or cloud-based files into the communication. By presenting cloud-based file links in the attachment file, the attachment module of the communication application 208 may treat them like a downloaded file for purposes of searching a mailbox or communication application data of the sending user 212.

In further embodiments, if the attachments include links to locations of cloud-based files that are displayed in an attachment well, and one or more of the recipient client applications are not capable of processing the links to the cloud-based files presented in the attachment through an attachment well, the attachment may be presented within the body of the correspondence 224. In another example, if the sending user 212 includes the attachments with cloud-based files within the body of the correspondence 224, and the one or more of the recipient client applications are capable of processing and displaying links in the attachment well, than the recipient applications may display the attachment in the attachment well and in the body. Additionally, the attachment may be removed from the body of the correspondence such that the attachment is only displayed in the attachment well.

If the correspondence 224 is sent to multiple recipients, as illustrated in the diagram 200, and one of the recipients sends a reply all communication adding one or more new recipients, the attachments may be inserted in the emails to the new recipients only and not included in the recipients who already received them. Accordingly, the recipients who already received them may simply receive the body of the email.

Figure 3:
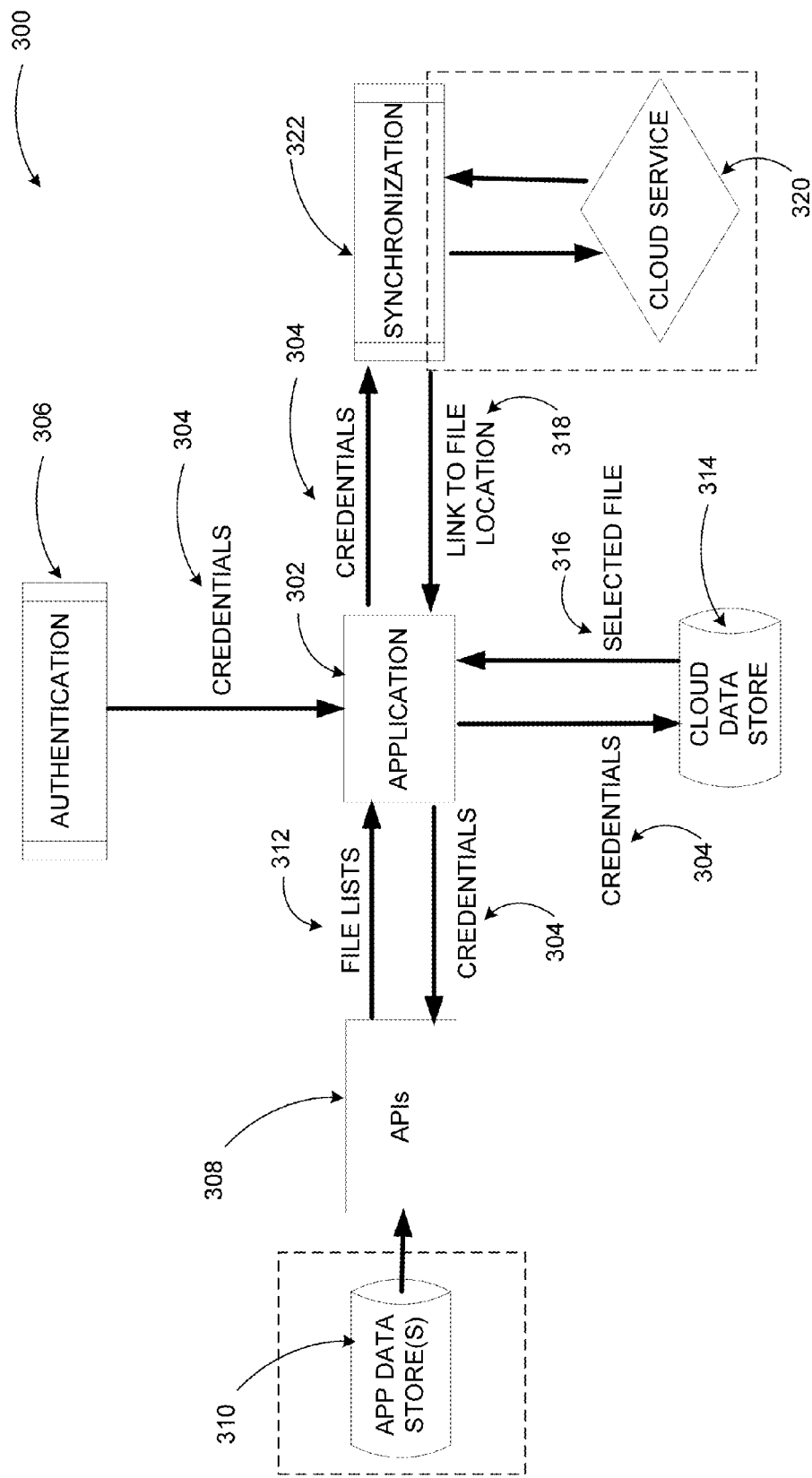
FIG. 3 illustrates an example system for treatment of cloud-based and local attachments in a communication application.

FIG. 3 illustrates an example system for treatment of cloud-based and local attachments in a communication application. As illustrated in diagram 300, a communication application 302 may determine one or more credentials 304 associated with a user through an authentication 306 sub-process. The communication application 302 may provide the user credentials 304 to one or more application programming interfaces (APIs) 308 associated with one or more individual applications of the user, such as word processing, spreadsheet, presentation, imaging, audio play, video play, and recording applications, among other examples, or from consolidating services associated with one or more applications. The APIs 308 may aggregate files associated with the user from one or more data stores 310 associated with the individual applications, and provide lists of files 312 to the communication application 302.

An attachment module of the communication application 302 may use the lists of files 316 to determine files of interest to the user, and present a suggested file list for attachment to a correspondence that is being prepared in response to detecting an intent of the user to attach a file to the correspondence. The files of interest may include locally stored files or cloud-based files, and may be determined based on whether the sending user has recently viewed, modified, saved, listened to, shared, pinned, or sent the files, for example. Upon user selection of one or more files from the list, the attachment module of the communication application 302 may attach the selected files or links to locations of the selected files to the correspondence. If a locally stored file is selected as the attachment, the selected file may be uploaded to a cloud data store or service and a link to a location of the uploaded file within the cloud data store or service may be attached. If a cloud-based file is selected as the attachment, as illustrated in diagram 300, the communication application 302 may provide the user credentials 304 to a cloud data store 314, where the selected file is located in order to download the selected file 316 and attach to the correspondence. Additionally or alternatively, if a cloud-based file is selected as the attachment, as further illustrated in diagram 300, the communication application 302 may provide the user credentials 304 to a cloud service 320 hosting the selected file in order to download a link 318 to a cloud location of the selected file and attach to the correspondence.

In some examples, if the attachment is a cloud-based file, the communication application 302 may be further configured to determine whether a recipient of the correspondence comprising the link to the cloud location of the attached file has permission to access a location of the attached file. If the recipient has permission, the recipient may access the attached file through the link using their own credentials. If the recipient does not have permission, the communication application may create a one-time guest access for the recipient to access the attached file through the link.

In other examples, if the attachment is a cloud-based file, the recipient's client application may be configured to download and present the latest version of the attached file when the recipient accesses the attachment depending on whether or not the recipient is online. If the recipient is not online, the version that was sent may be shown. If the recipient is online, the attachment may be updated and shown. Furthermore, if the recipient is online, they may not only receive a downloaded copy of the most recent version of the attached file, but they may have a version of the file which is continually updated in real time as both they and other users change the file. For example, the file may be continually updated through a synchronization sub-process 322 performed by a synchronization engine of the cloud service 320.

Figure 4:
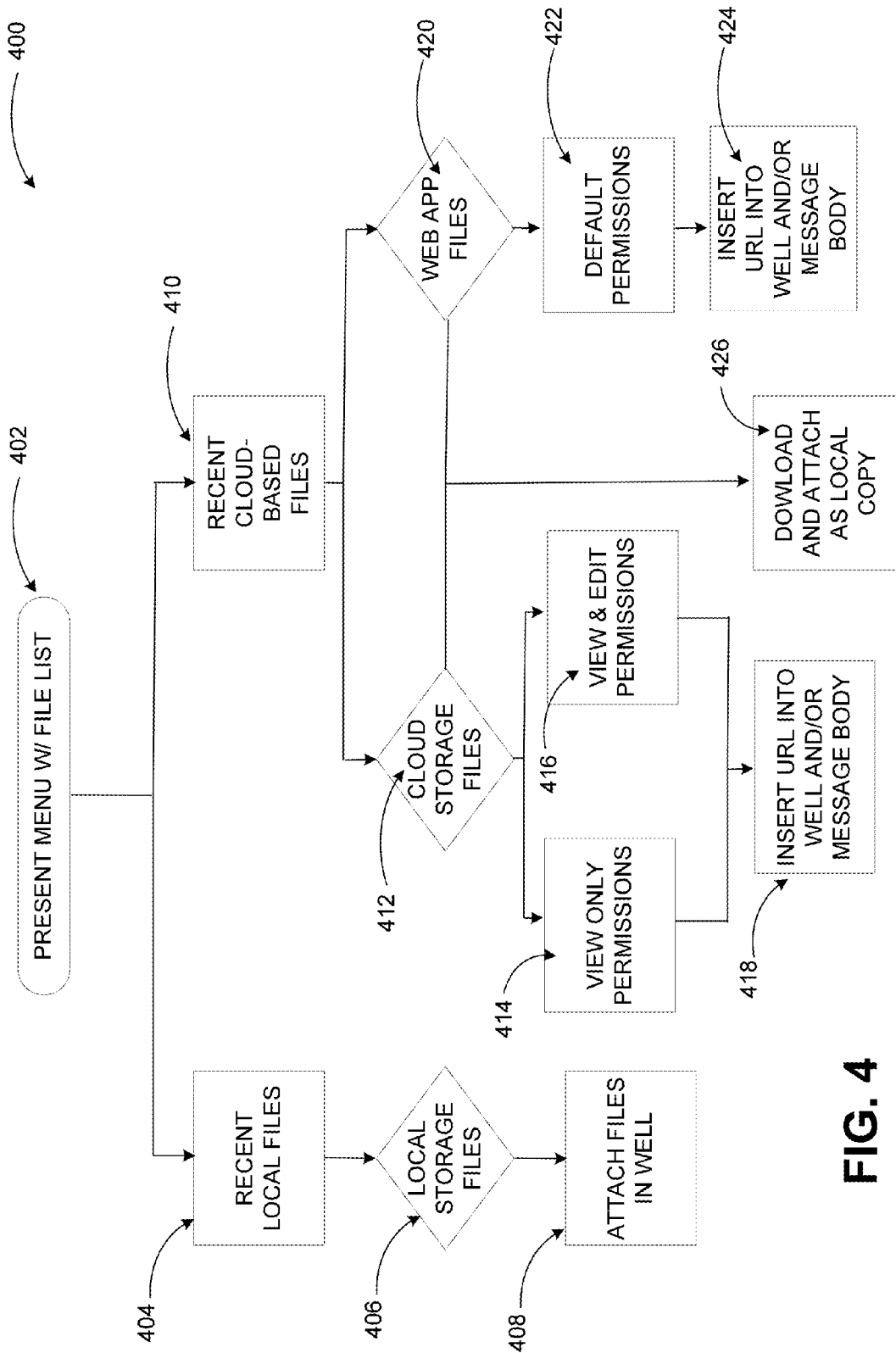
FIG. 4 illustrates an example process for treatment of cloud-based and local attachments in a communication application.

FIG. 4 illustrates an example process for treatment of cloud-based and local attachments in a communication application. In response to detecting an intent of the user to attach a file to the correspondence, an attachment module of a communication application may be configured to determine files of interest to the user and present a suggested file list for attachment to the correspondence to the user through a user experience of the communication application or through a separate user experience.

As illustrated in diagram 400, the user experience may present a menu 402 listing files of interest that the user may wish to attach to the correspondence, where the menu may be a drop-down menu, pop-up menu, or other similar menu. The source of the files on the list may be local 404 or cloud-based 410, and the files may be selected for presentation by the communication application based on most recently viewed, modified, saved, listened to, shared, pinned, or sent files. The user may then be enabled to select one or more of the files to attach to the correspondence. If the source of the selected file is local 404, the selected file may be retrieved from local storage files 406, which may be at the user's computing device or network drive, for example, and attach the selected file to the correspondence in an attachment well 408. In some examples, the selected file may be uploaded to a cloud data store or service and a link to a location of the uploaded file within the cloud data store or service may be attached. For example, upon detection that the selected file is too large in size to attach as a local copy within the correspondence due to limitations of a current communication server, the selected file may be uploaded to the cloud, and a link to a location of the uploaded file may be attached to the correspondence instead. In some embodiments, the selected file may be uploaded asynchronously to the cloud.

If the source of the selected file is cloud-based 410, the selected file may be stored in cloud storage 412 and/or hosted by a web application 420, for example. If the selected file is stored in cloud storage 412, the user may configure permissions to be associated with the selected file for attachment. For example, the user may choose to associate view only permissions 414 with the selected file, or the user may choose to associate view and edit permissions 416 with the selected file. Once permissions have been associated with the selected file, a link to a location of the selected file may be inserted into one or both of an attachment well and a message body of the correspondence 418. Alternatively, the selected file may be downloaded from the cloud storage and attached as a local copy of the selected file 426 displayed in an attachment well.

If the selected file is hosted by a web application 420, default permissions 422 set by the web application may be associated with the selected file, where the permissions may include one or more of view, edit, forward, and save. In some examples, an option may be presented to the user to modify the default permissions associated with the selected file. A link to a location of the selected file may then be inserted into one or both of an attachment well and a message body of the correspondence 424. Alternatively, the selected file may be downloaded from the web application and attached as a local copy of the selected file 426 displayed in an attachment well.

Figure 5A:
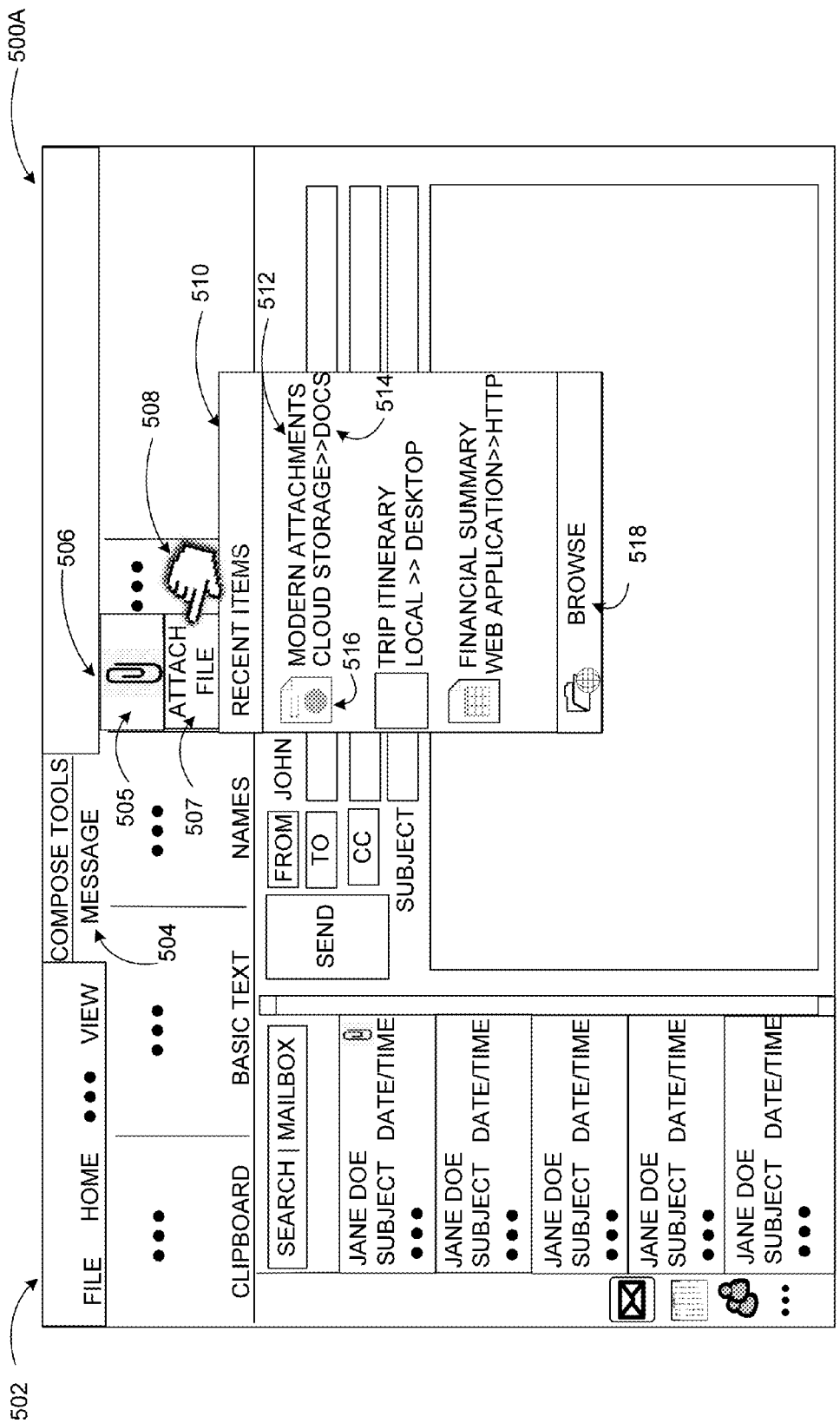
FIGS. 5A-D illustrate an example user experience for presentation of a suggested file list to a user for selection.

FIGS. 5A-D illustrate an example user experience for presentation of a suggested file list to a user for selection. As shown in FIG. 5A, diagram 500A, a communication application 502 may enable a user to create and send correspondence to one or more recipients through one or more modalities, such as email, text messaging, audio/video conferencing, application sharing, desktop sharing, and the like. For example, the user may compose an email message 504 with an intent to attach a file. The user's intent to attach the file may be detected by the communication application 502 in response to a user action 508 associated with an "Attach File" control element 506 displayed on a user experience of the communication application 502. The "Attach File" control element 506 may be displayed in various locations on the user experience, such as a tool bar, a ribbon bar, and/or an action bar. The user action may be performed through a touch input, as illustrated, gesture input, voice command, eye tracking, gyroscopic input, pen input, mouse input, and/or keyboard input.

In some embodiments, the "Attach File" control element 506 may be a single control (e.g., in touch and gesture based devices), that when invoked may cause a menu 510 to be presented, where the menu 510 may be a drop-down menu, as illustrated, or a pop-up menu. The menu 510 may include a list of local and cloud-based files of interest presented to the user for selection. An attachment module of the communication application may be configured to determine the list of local and cloud-based files of interest presented to the user for selection based on one or more lists of files received from one or more application programming interfaces associated with one or more applications of the user. The files of interest may be determined based on whether the user has recently viewed, modified, saved, listened to, shared, pinned, or sent them, for example. An order and/or a grouping of the files in the list may be based on the same criteria as well as a recentness of interaction, a type of interaction, and a type of file. Each file listed within the menu 510 may include a name 512 of the file, an indication of a type 516 of file and/or a source 514 of the file. Any graphical, textual, coloring, shading, or visual effect scheme may be used to present the file names, types, and sources. For example, the name 512 of the file may be textually represented, "Modern Attachments", the type 516 of the file may be represented through a graphical icon to indicate a presentation document, and a source 514 of the file may be textually represented to indicate cloud storage. If the user wishes to attach a file that is not presented within the list, a browse selection may also be presented. For example, the menu 510 may include a "Browse" control element 518 that when invoked may cause a conventional "Insert File" dialog box to be presented on the user experience enabling the user to browse and select a file to insert as the attachment. In some examples, if there is limited or no Internet connectivity, an error may be displayed at the top of the menu 510 to indicate that certain functionalities may be limited.

In other examples, the "Attach File" control element 506 may be a composite control (e.g., in non-touch and non-gesture based devices) that comprises a primary control element 505, and a secondary control element 507. For example, the primary control element 505 when invoked may cause the conventional "Insert File" dialog box to be presented on the user experience enabling the user to browse and select a file to insert as the attachment. The secondary control element 507 when invoked may cause the menu 510, as described in detail above, to be presented.

The menu 510 may implement one or more scrolling schemes. For example, the menu 510 may implement smooth, "just in time" scrolling where the last file may be partially hidden and/or cut off to indicate to the user that there is more content. When the user scrolls to a bottom of the list of files, more content may be loaded. If there is a wait time during the content load, users may see a "loading more items" animation and/or text, for example. Otherwise, once the new files have loaded, the list of new files may smooth scroll to the top such that the user may view the list from top to bottom.

Figure 5B:
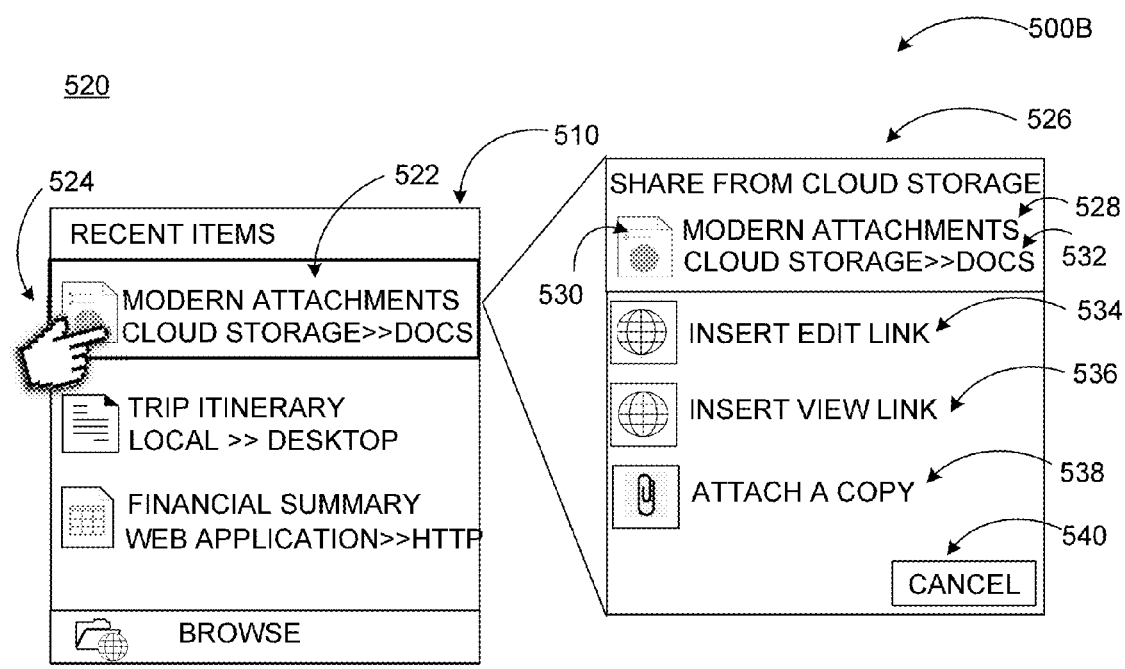
Figure 5B:
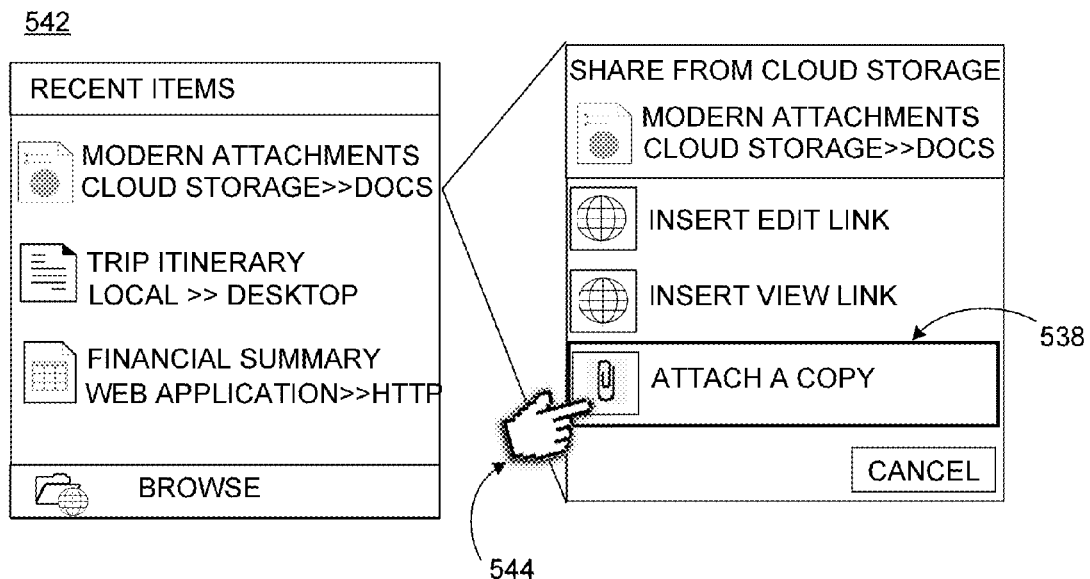

As shown in FIG. 5B, diagram 500B, when one or more elements of the menu 510 are invoked by the user, the menu 510 may roll out and/or animation may occur. In configuration 520, a user may select a file 522 from the menu 510 through a user action 524 In response to the user action 524, another menu 526, which may be a pop-up menu may be presented. The other menu 526 may include a name 528 of the selected file 522, an indication of a type 530 of selected file 522 and/or a source 532 of the selected file 522. Any graphical, textual, coloring, shading, or visual effect scheme may be used to present the selected file name, type, and source. The other menu 526 may also include one or more options 534, 536, 538 (where the options may be represented textually and/or graphically, as illustrated) for the user to select for attachment of the selected file 522, and a "Cancel" control element 540 if the user wishes to no longer attach the selected file 522.

In some embodiments, the options 534, 536, 538 for attachment may be based on whether the selected file 522 is a locally stored file or a cloud-based file that is stored in cloud storage and/or hosted by a web application. For example, the selected file 522 may be a cloud-based file stored in cloud storage. One option for a cloud-based file stored in cloud storage may include to insert the selected file 522 as a link displayed in an attachment well and/or within a body of the email message 504 for attachment, where the attachment may be associated with edit permissions 534. Accordingly, one or more recipients of the email message 504 may be enabled to access the selected file 522 through the link and edit the selected file 522. Another option for a cloud-based file stored in cloud storage may include to insert the selected file 522 as a link displayed in an attachment well and/or within a body of the email message 504 for attachment, where the attachment may be associated with view only permissions 536. Accordingly, one or more recipients of the email message 504 may be enabled to access the selected file 522 through the link, but may only be able to view the selected file 522. A further option for a cloud-based file stored in cloud storage may include to attach the selected file 522 as a local copy 538 displayed in an attachment well of the email message 504. Accordingly, the selected file 522 may be downloaded from the cloud storage and attached as a local copy.

In configuration 542, the user may select to attach the selected file 522 as a local copy 538 through a user action 544. In response to the user action 544, the selected file 522 may be downloaded from the cloud storage, and attached as a local copy.

Figure 5C:
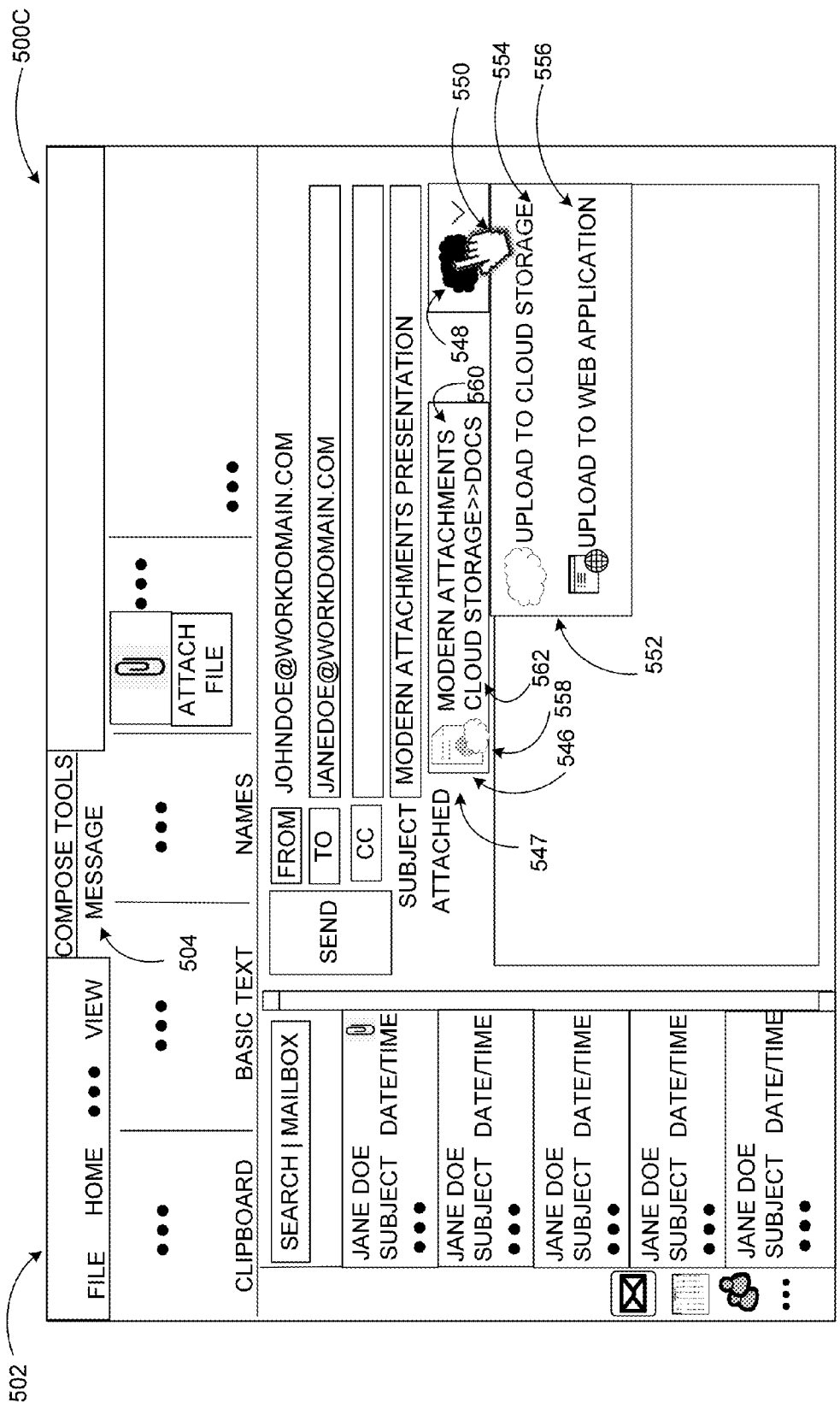

As shown in FIG. 5C, diagram 500C, attachment 546 (e.g., the selected file 522) may be displayed in an attachment well 547 of the email message 504. The attachment 546 may be shown in the attachment well 547 using a textual and/or graphical scheme, such as a name 560 and an icon 558 indicating a type and source of the file, for example, where the representation of the attachment 546 may also indicate a textual representation of the source 562 of the file. In some embodiments, a cloud icon 548 may be displayed adjacent to the attachment well 547. Any graphical, textual, coloring, shading, or visual effect scheme may be used for the cloud icon 548. For example, a shading of the cloud icon 548 may indicate whether the attachment 546 is already stored in cloud storage. As illustrated, the cloud icon 548 is heavily shaded, which may indicate that the attachment 546 is already stored in cloud storage. In other examples, the cloud icon 548 may be lightly shaded to indicate the attachment 546 is not stored in cloud storage. An example scenario where the cloud icon 548 may be lightly shaded may include when a locally stored file from a user's computing device or network drive is attached to the email message 504, for example.

A user may be enabled to invoke the cloud icon 548 through a user action 550. In response to the user action 550, a display element 552, which may be a drop down dialog box, for example, may be presented to the user. The display element 552 may include an option for the user to upload the attachment 546 to cloud storage 554 and/or upload the attachment 546 to a web application. In some embodiments, when the user selects multiple attachments, the display element 552 may include an option for the user to upload all attachments to cloud storage and/or upload all attachments to the web application. As previously discussed, the cloud icon 548, as illustrated, is heavily shaded indicating the attachment 546 is already stored in cloud storage, and therefore, the user may not need to upload the selected file 522. The user may then complete the email message 504 and send to one or more recipients through the communication application 502.

Figure 5D:
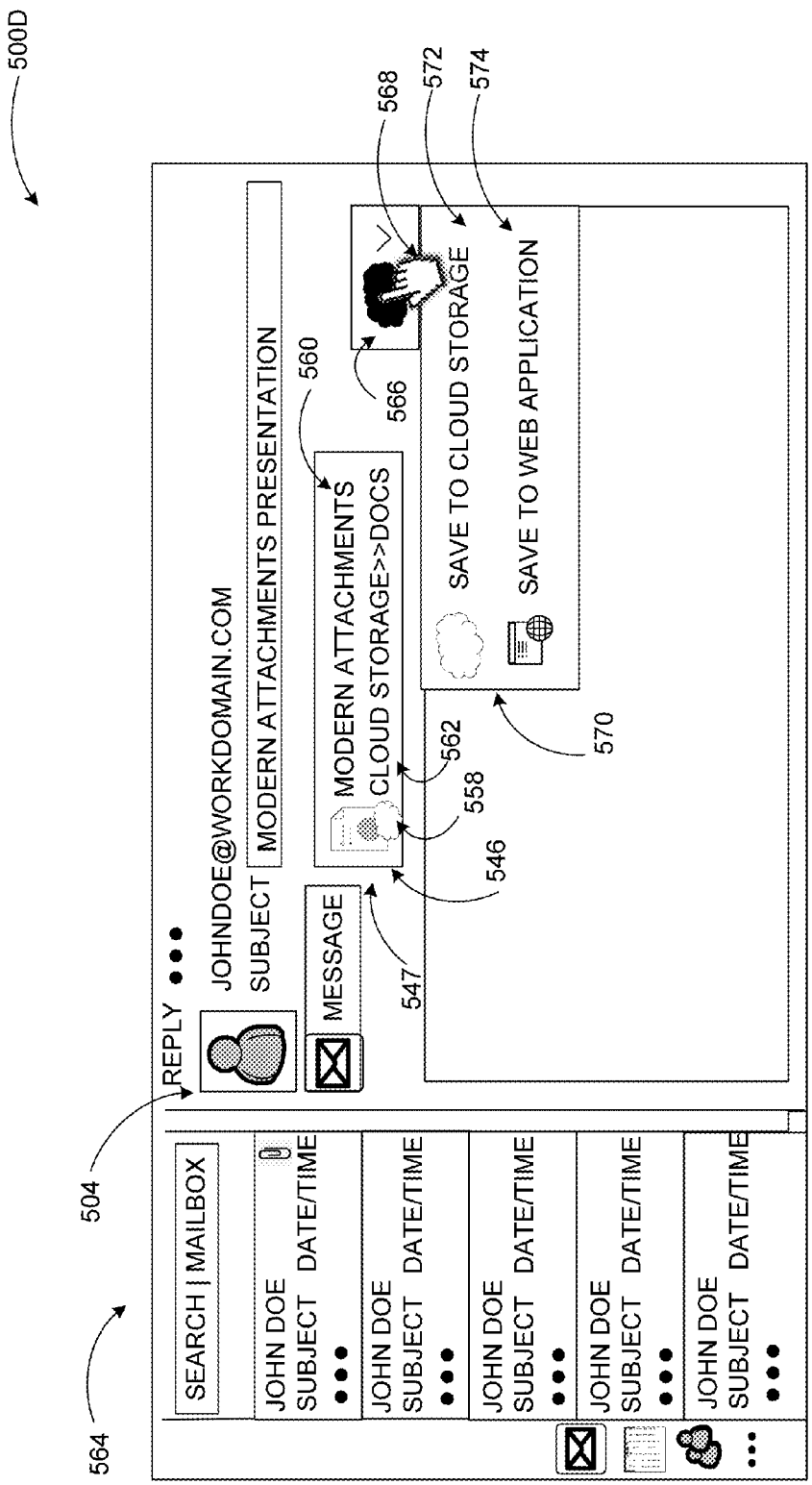

As shown in FIG. 5D, diagram 500D, a recipient may receive the email message 504 through a communication application 564 associated with the recipient. The email message 504 may include the attachment 546 displayed in the attachment well 547 using the same textual and/or graphical scheme, as previously discussed, including the name 560, the icon 558, and the textual representation of the source 562. Thus, the recipient may easily distinguish between cloud-based and local file attachments in the attachment well 547.

In some embodiments, another cloud icon 566 may be displayed adjacent to the attachment well 547. Any graphical, textual, coloring, shading, or visual effect scheme may be used for the cloud icon 566. Similar to the cloud icon 548, discussed in conjunction with FIG. 5C, a shading of the cloud icon 566 may indicate whether the attachment 546 is stored in cloud storage. As illustrated, the cloud icon 566 is heavily shaded, which may indicate the attachment 546 is already stored in cloud storage. A recipient may be enabled to invoke the cloud icon 566 through a recipient action 568. In response to the recipient action 568, a display element 570, which may be a drop down dialog box, may be presented to the recipient. The display element 570 may include an option for the recipient to save the attachment to cloud storage 572 and/or save the attachment to a web application 574. In some embodiments, when there are multiple attachments, the display element 570 may include an option for the recipient to save all attachments to cloud storage and/or save all attachments to the web application. As previously discussed, the cloud icon 566, as illustrated, is heavily shaded indicating the selected file is already stored in cloud storage, and therefore, the recipient may not feel it necessary to upload the attachment 546.

Figure 6A:
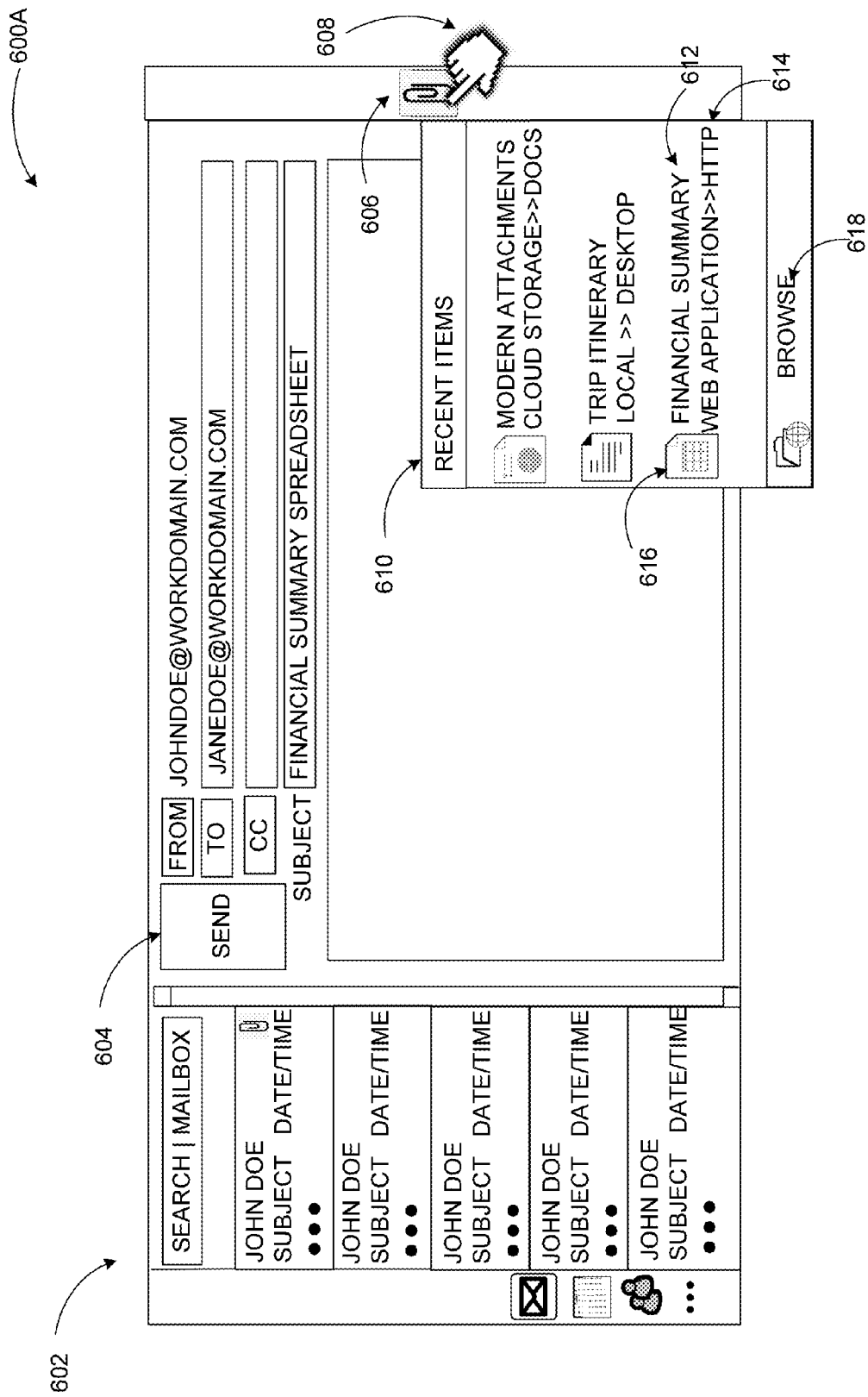
FIGS. 6A-C illustrate another example user experience for presentation of a suggested file list to a user for selection.
Figure 6B:
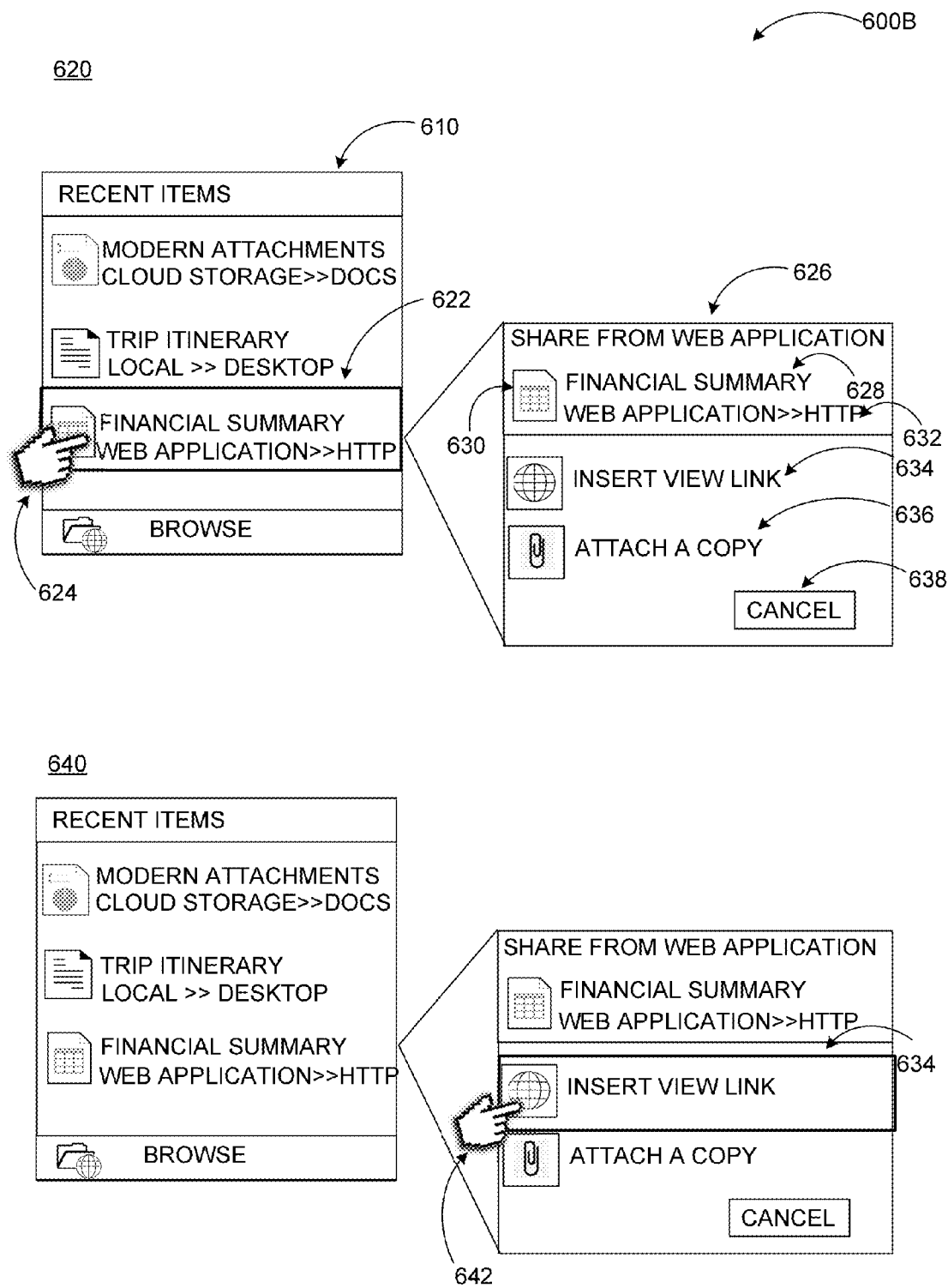
Figure 6C:
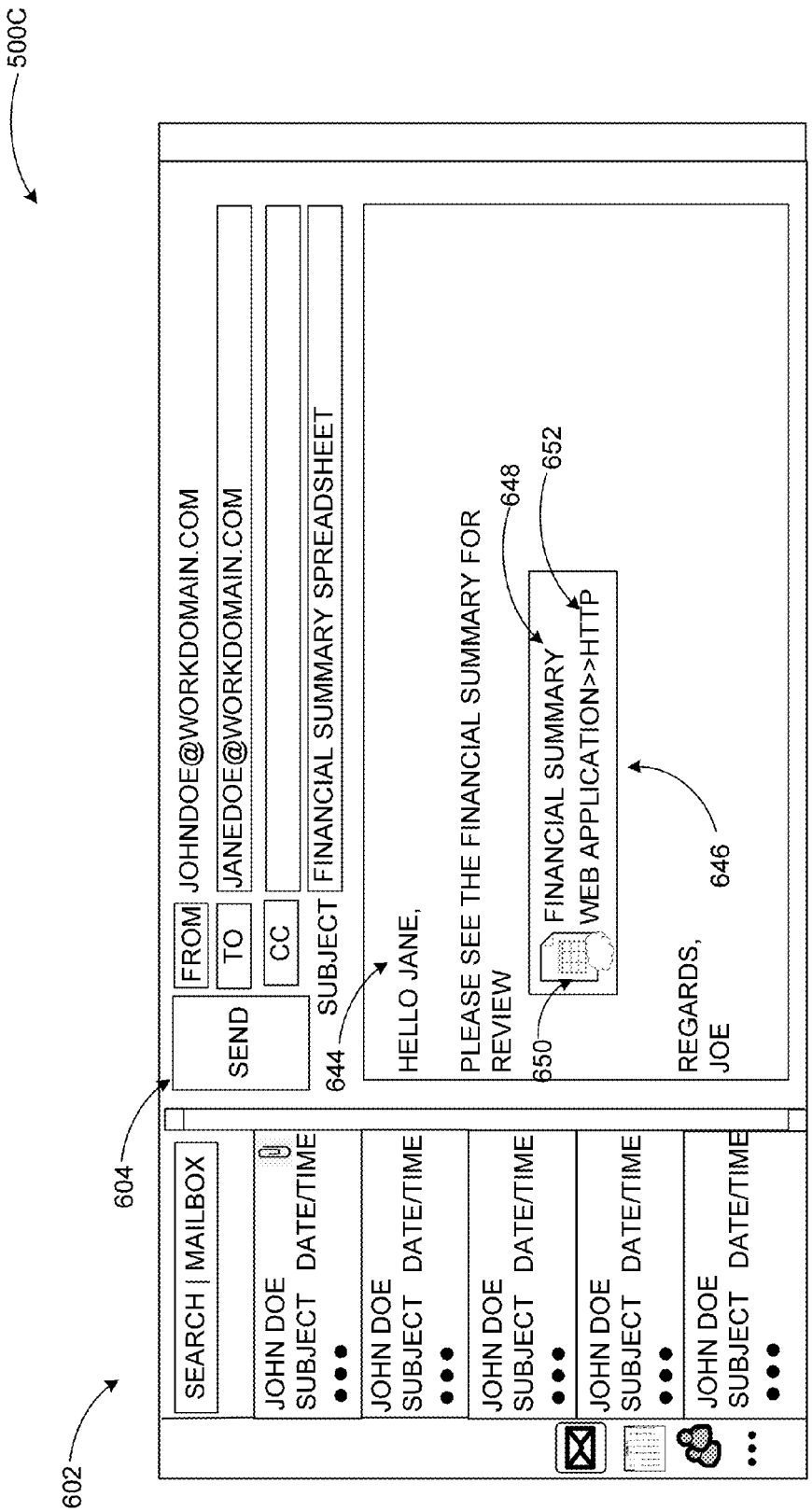

FIGS. 6A-C illustrate another example user experience for presentation of a suggested file list to a user for selection.

As shown in FIG. 6A, diagram 600A, a communication application 602 may enable a user to create and send correspondence to one or more recipients through one or more modalities, such as email, text messaging, audio/video conferencing, application sharing, desktop sharing, and the like. For example, the user may compose an email message 604 with an intent to attach a file. The user's intent to attach the file may be detected by the communication application 602 in response to a user action 608 associated with an "Attach File" control element 606 displayed on a user experience of the communication application 602. The "Attach File" control element 606 may be displayed at various locations on a user experience, such as a tool bar, a ribbon bar, and/or an action bar for example. The user action may be performed through a touch input, as illustrated, gesture input, voice command, eye tracking, gyroscopic input, pen input, mouse input, and/or keyboard input.

The control element 606 when invoked may cause a menu 610 to be presented, where the menu 610 may be a drop-down menu, as illustrated, or a pop-up menu. The menu 610 may include a list of local and cloud-based files of interest presented to the user for selection. An attachment module of the communication application 602 may be configured to determine the list of local and cloud-based files of interest presented to the user for selection based on one or more lists of files received from one or more application programming interfaces associated with one or more applications of the user. The files of interest may be determined based on whether the user has recently viewed, modified, saved, listened to, shared, pinned, or sent them, for example. An order and/or a grouping of the files in the list may be based on the same criteria as well as a recentness of interaction, a type of interaction, and a type of file.

Each file listed within the menu 610 may include a name 612 of the file, an indication of a type 616 of file and/or a source 614 of the file. Any graphical, textual, coloring, shading, or visual effect scheme may be used to present the file names, types, and sources. For example, the name 612 of the file may be textually represented, "Financial Summary", the type 616 of the file may be represented through a graphical icon to indicate a spreadsheet document, and a source 614 of the file may be textually represented to indicate a web application by including an address of the web application, for example. If the user wishes to attach a file that is not presented within the list, a browse selection may also be presented. For example, the menu 610 may include a "Browse" control element 618 that when invoked may cause a conventional "Insert File" dialog box to be presented on the user experience enabling the user to browse and select a file to insert as the attachment. In some examples, if there is limited or no Internet connectivity, an error may be displayed at the top of the menu 610 to indicate that certain functionalities may be limited.

The menu 610 may implement one or more scrolling schemes. For example, the menu may implement smooth, "just in time" scrolling where the last file may be partially hidden and/or cut off to indicate to the user that there is more content. When the user scrolls to a bottom of the list of files, more content may be loaded. If there is a wait time during the content load, users may see a "loading more items" animation and/or text, for example. Otherwise, once the new files have loaded, the list of new files may smooth scroll to the top such that the user may view the list from top to bottom.

As shown in FIG. 6B, diagram 600B, when one or more elements of the menu 610 are invoked by the user, the menu 610 may roll out and/or animation may occur. In configuration 620, a user may select a file 622 from the menu 610 through a user action 524. In response to the user action 624, another menu 626, which may be a pop-up menu, may be presented. The other menu 626 may include a name 628 of the selected file 622, an indication of a type 630 of selected file 622 and/or a source 632 of the selected file 622. Any graphical, textual, coloring, shading, or visual effect scheme may be used to present the selected file name, type, and source. The other menu 626 may also include one or more options 634, 636 (where the options may be represented textually and/or graphically, as illustrated), for the user to select for attachment of the selected file 622, and a "Cancel" control element 638 if the user wishes to no longer attach the selected file 622.

In some embodiments, the options 634, 636 for attachment may be based on whether the selected file 622 is a locally stored file or a cloud-based file that is stored in cloud storage and/or hosted by a web application. For example, the selected file 622 may be a cloud-based file hosted by a web application. In a web application, default permissions set by the web application may be associated with the selected file 622. For example, the default permissions may include view only. Accordingly, one option for the cloud-based file hosted by the web application may include to insert the selected file 622 as a link to a location of the selected file 622, where the attachment may be associated with view only permissions 634. The link may be displayed within a body of the email message 604 for attachment or may be displayed in an attachment well of the email message 604. Accordingly, one or more recipients of the correspondence may be enabled to access the selected file 622 through the link, but may only be able to view the selected file 622. Another option for a cloud-based file stored in a web application may include to attach the selected file 622 as a local copy 636. Accordingly, the selected file 622 may be downloaded from the web application and displayed in an attachment well of the email message 604. In configuration 640, the user may select to insert the selected file 622 as a link to a location of the selected file 622, where the attachment may be associated with view only permissions 634 through a user action 642.

As shown in FIG. 6C, diagram 600C, in response to the user selection to attach the selected file as a link to a location of the selected file, attachment 646 (e.g., the selected file 622) may be displayed within a body 644 of the email message 604. In other embodiments, the attachment 646 may be displayed within an attachment well of the email message 604. The attachment 646 may be displayed using a textual and/or graphical scheme, such as a name 648 and an icon 650 indicating a type and source of the file, for example, where the representation of the attachment may also indicate a textual representation of the source 652 of the file. The user may then complete the email message 604 and send to one or more recipients through the communication application 602.

Once received by the recipients, access to the attached file through the link may be through the recipients' own credentials if the recipients have access to the same web application associated with the attachment 646, or through a one-time guest access. In some examples, the communication application 602 may configure this access upon determining whether or not the recipients have access to the web application associated with the attachment 646.

The examples in FIGS. 1 through 6 have been described using specific network environments, systems, applications, user experiences, and processes to treat cloud-based and local attachments in a communication application. Embodiments to employ context-based inference to treat cloud-based and local attachments in a communication application are not limited to the specific network environments, systems, applications, user experiences, and processes according to these examples.

Treatment of cloud-based and local attachments in communication applications may simplify and increase efficiency of correspondence between users. For example, the smart suggestion of files to attach to a user may reduce user time, processor load, and memory load by reducing downloading of files from cloud-based data stores before sending, review of a variety of data sources by the sending user, and/or downloading of updated versions of attached documents by recipients. Thus, treatment of cloud-based and local attachments in communication applications may advantageously require less storage space within the data store, and therefore reduce hardware requirements. Furthermore, treatment of cloud-based and local attachments in communication applications may advantageously improve usability. For example, efficiency of co-authoring documents may improve as the document may easily be attached to correspondence through a link to the documents location in storage.

Further advantages may include, but are not limited to, ability to find files one is likely to want to send easier, especially in the case of files in the cloud which may be difficult to find/navigate to; easier navigation on touch or gesture user experiences; links taking less disk space on users' machines; links taking less bytes over the wire to both send and receive; and links allowing the users to view the most recent document and co-author with other people. Attachment suggestions may no longer be limited to the user's computing device as they can easily find attachments from the cloud or from their other computing devices. Furthermore, files that are typically larger than a communication server may allow to be attached, may be attached by uploading the files to the cloud and attaching a link to the files locations within the cloud. Only the new recipients receiving copies of the attachment when an email with attachments is sent to previous and new recipients may save both disk space and bytes over the wire for all existing recipients on the conversation thread. Links with user-based permissions may be more secure, as a man-in-the-middle attacks may not view the contents of the attachment. The list of suggested files for attachment may also be used as a way to quickly find files of interest to users. That is, there may be other advantageous uses of the list beyond the main intended one of sending attachments.

Figure 7:
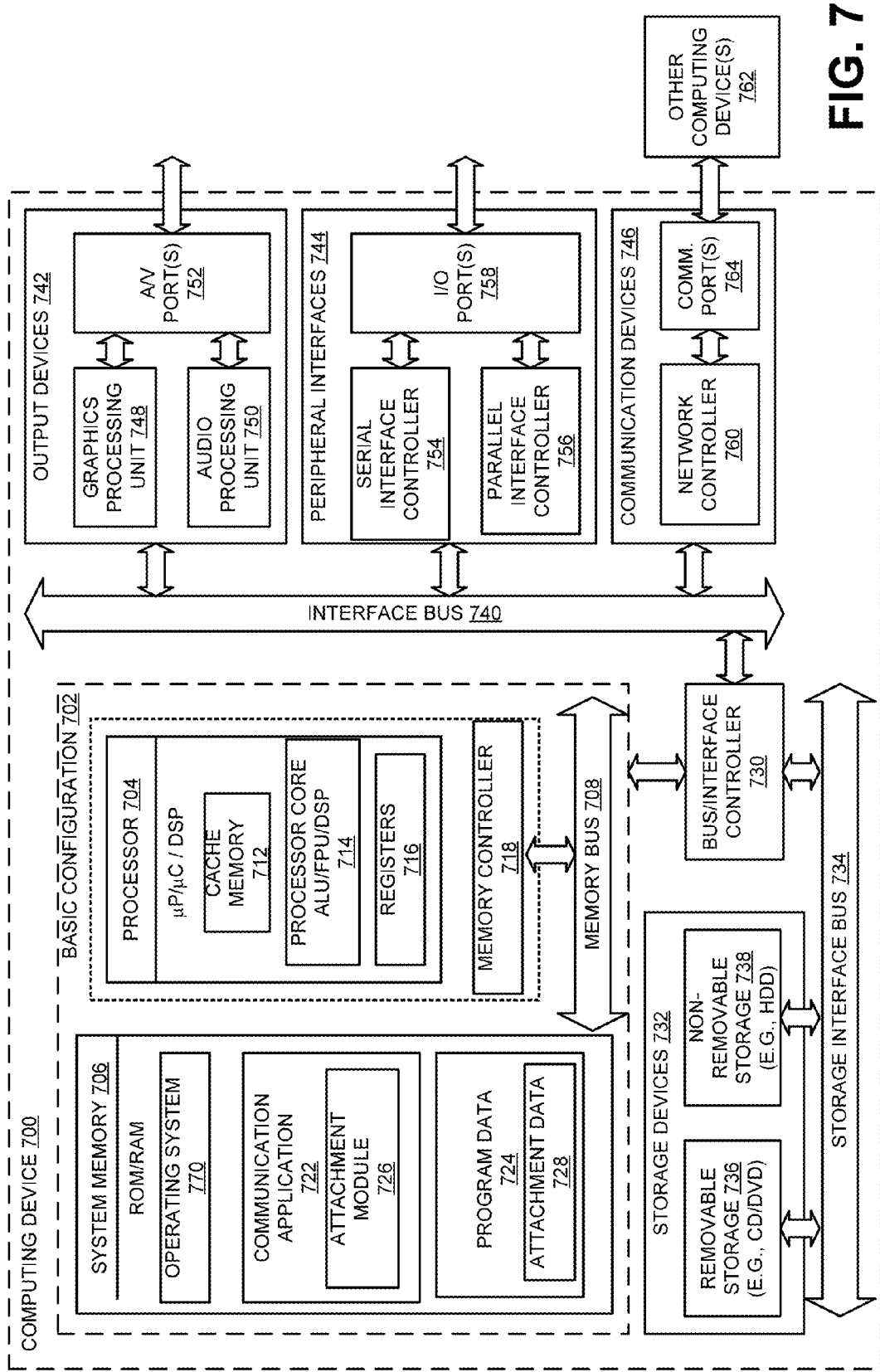
FIG. 7 is a block diagram of an example general purpose computing device, which may be used for treatment of cloud-based and local attachments in communication applications.

FIG. 7 and the associated discussion are intended to provide a brief, general description of a general purpose computing device, which may be used for treatment of cloud-based and local attachments in communication applications, according to embodiments as described herein.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a communication application 722, and program data 724. The communication application 722 may include an attachment module 726, which may be an integral part of the communication application 722 or a separate application. The communication application 722 may enable exchange of correspondence such as email, text messaging, calendar items, and other forms of electronic conversation. The attachment module 726 may enable attachment of local or cloud-based files to correspondence through an optimized and efficient user experience by suggesting files of various types and source to a sending user, where the files may be of interest to the user to send as attachments. The attachment module 726 may perform the tasks associated with the example embodiments described herein. Program data 724 may include, among other things, attachment data 728 related to the attachments, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, sand comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set of changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods for treatment of cloud-based and local attachments in communication applications. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
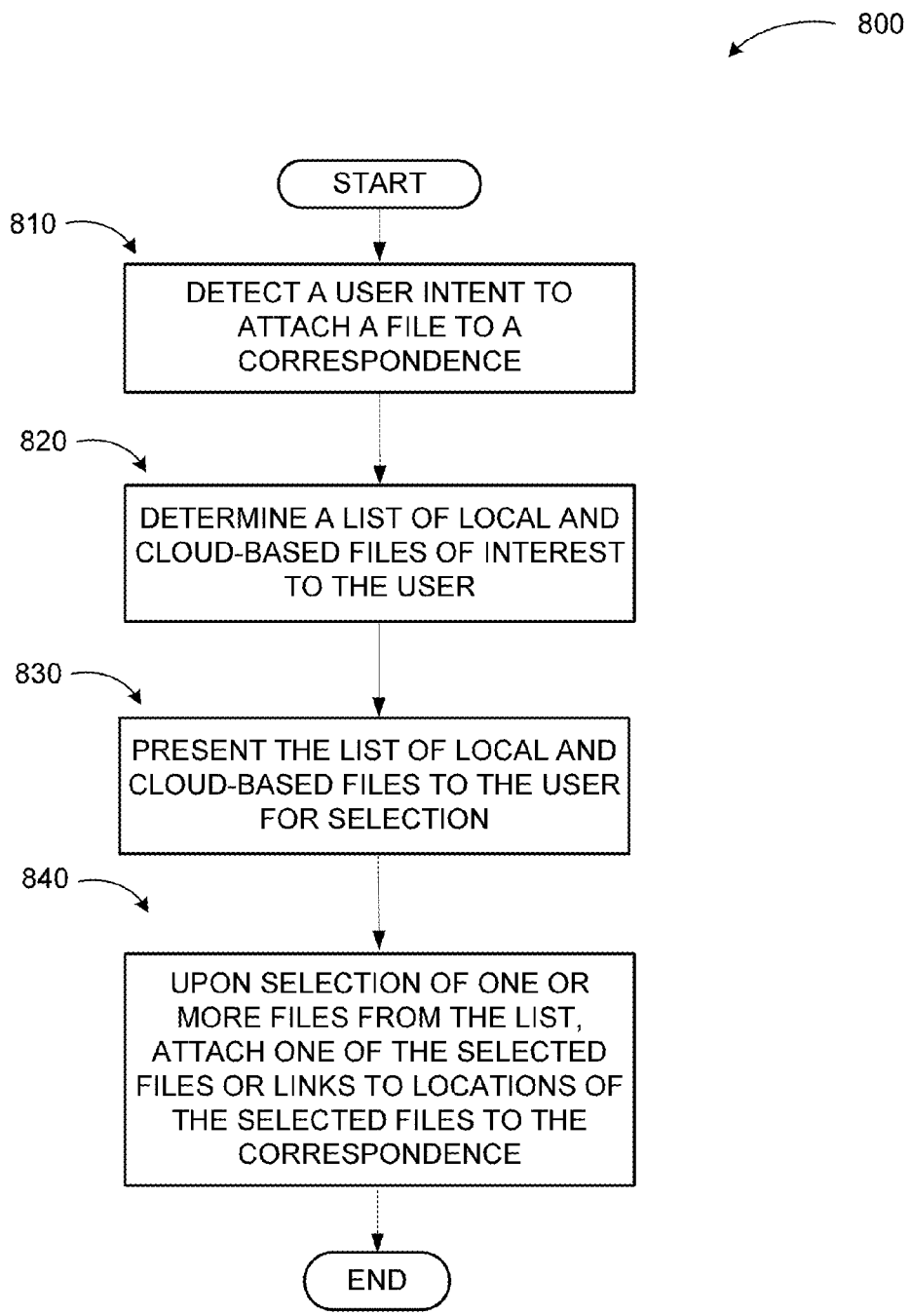
FIG. 8 illustrates a logic flow diagram of an example process of treatment of cloud-based and local attachments in communication applications, according to embodiments.

FIG. 8 illustrates a logic flow diagram for an example process of treatment of cloud-based and local attachments in communication applications, according to embodiments. Process 800 may be implemented on a server or other system.

Process 800 begins with operation 810, where an attachment module of a communication application may be configured to detect a user intent to attach a file to a correspondence. The user intent may be detected through a user action performed on a user experience associated with communication application. The user action may be one or more of touch input, gesture input, voice command, eye tracking, gyroscopic input, pen input, mouse input, and/or keyboard input. For example, the user may use a touch input to invoke an "Attach File" control element on the user experience.

At operation 820, the attachment module may be configured to determine a list of local and cloud-based files of interest to the user based on one or more lists of files received from one or more application programming interfaces associated with one or more applications of the user. The files of interest may be from a variety of sources such as files locally stored at the user's computing device, files stored at the user's network drive, files from social or professional networks, files from a collaboration service to which the user subscribes, and other cloud-based files such as files of other people that may be associated with the user. The files of interest may be determined based on whether the user has recently viewed, modified, saved, listened to, shared, pinned, or sent them, for example.

At operation 830, the attachment module may be configured to present the list of local and cloud-based files to the user for selection. The list may be presented through a user experience associated with the communication application or a separate user experience, where any type of graphical, textual, coloring, shading, or visual effect scheme may be used to present file types, sources, and reason for listing a file. An order and/or a grouping of the suggested files may be based on the same criteria as well as a recentness of interaction, a type of interaction, and a type of file. The suggested files may be presented and/or grouped based on default rules, user configuration, and/or inference by the attachment module of the communication application.

At operation 840, upon the user selection of one or more files from the list, the attachment module may be configured to attach the selected files or links to locations of the selected files to the correspondence. The attachment, whether a file or link, may be shown in an attachment well or within the body of the email using a textual and/or graphical scheme that may indicate a type and/or a source of the file or link.

The operations included in process 800 are for illustration purposes. Treatment of cloud-based and local attachments in communication applications may be implemented by similar processes with fewer or additional steps, as well as in different order of operations using the principles described herein.

A means for treatment of cloud-based and local attachments in, a communication application may include a means for detecting a user intent to attach a file to a correspondence; a means, for determining a list of local and cloud-based files of interest to the user; a means for presenting the list of the local and cloud-based files to the user for selection; and a means for upon selection of one or more files from the list, attaching one of the selected files or links to locations of the selected files to the correspondence.

According to some examples, methods for treatment of cloud-based and local attachments in a communication application are provided. An example method may include detecting a user intent to attach a file to a correspondence, determining a list of local and cloud-based files of interest to the user, presenting the list of the local and cloud-based files to the user for selection, and upon selection of one or more files from the list, attaching one of the selected files or links to locations of the selected files to the correspondence.

In other examples, determining the list of local and cloud-based files of interest to the user may include determining files based on whether the user has recently viewed, modified, saved, listened to, shared, pinned, or sent the files. The list of local and cloud based files may be ordered and/or grouped based on whether the user has recently viewed, modified, saved, listened to, shared, pinned, or sent the files and one or more of a recentness of user interaction with a file, a type of user interaction with the file, and a type of the file. The list of local and cloud-based files may be ordered and/or grouped based on default rules, a user configuration, and/or an inference by the communication application. An attached file or a link to a location of an attached file may be displayed in one of an attachment well or a body of an email correspondence using one or more of a textual and a graphical scheme to represent the attached file.

In further examples, the list of local and cloud-based files may be determined by receiving one or more lists of files from one or more application programming interfaces associated with one or more applications of the user. One or more permissions associated with an attached file may be determined based on original permissions associated with the file and/or a user configuration, where the permissions may include view, edit, forward, and/or save. An option may be presented to the user to modify the permissions associated with the attached file, and the permissions may be enforces upon receipt of the attached file by a recipient. Whether a recipient of a link to an attached file has access to a location of the attached file through a pre-existing service subscription may be determined. If the recipient has access, the recipient may be enabled to access the attached file using their own credentials associated with the pre-existing service subscription. If the recipient does not have access, a one-time guest access may be created for the recipient. The recipient may be enabled to set permissions for an attached file that belongs to another user.

In yet further examples, the selected file may be uploaded to the cloud and a link to a location of the uploaded file may be attached, if a locally stored file is selected as attachment. The selected file may be downloaded and the downloaded file may be attached to the correspondence based on one of a default rule and a user configuration, if a cloud-based file is selected as attachment. A recipient's client application may be enabled to retrieve a latest version of the file if the recipient in online or to use a sent version of the attachment if the recipient is off-line if a cloud-based file is selected as attachment. Upon detecting insertion of a link to a cloud-based file within a body of an email correspondence by the user, automatically attaching the cloud-based file may be automatically attached and displayed on a user experience as an attached file. Upon transmission of the correspondence to multiple recipients and one of the recipients forwarding to a group of recipients that includes at least one of the multiple recipients and at least one new recipient, transmission of the forwarded correspondence with the attached files to the at least one new recipient and without the attached files to the at least one of the multiple recipients may be enabled. A receiving client application that is capable of processing a link to a cloud-based file presented in an attachment well may be enabled to present the link in one or both of the attachment well and a body of an email, and another receiving client that is not capable of processing the link to the cloud-based file presented in the attachment well may be enabled to present the link as a link within the body of the email.

According to some embodiments, computing devices for treatment of cloud-based and local attachments in a communication application are described. An example computing device may include an input device, a display device, a memory configured to store instructions, and a processor coupled to the memory. The processor, in conjunction with instructions stored in the memory, may be configured to detect a user intent to attach a file to a correspondence through the input device, determine a list of local and cloud-based files of interest to the user, present the list of the local and cloud-based files to the user for selection through the display device, and upon selection of one or more files from the list, attach one of the selected files or links to locations of the selected files to the correspondence, where the attached file or the link to the location of the attached file is displayed in an attachment well and/or a body of an email correspondence.

In other embodiments, the processor may be configured to present the list of the local and cloud-based files to the user for selection through the display device by displaying one of a drop-down menu and a pop-up menu on a user experience, and by displaying a browse selection on the user experience. The processor may be further configured to treat the link to the location of the attached file as a local file such that the link is searchable within the list, where a graphical, a textual, a coloring, a shading, and a visual effect scheme may be employed to distinguish between local and cloud-based files presented within the list, along with file types, file sources, and reasons for listing a file.

According to some examples, systems for treatment of cloud-based and local attachments in a communication application are described. An example system may include a first server configured to provide a communication service, a second server configured to store files associated with users of the communication service, and a communication application executed on the first server. The communication application may be configured to detect a user intent to attach a file to a correspondence, where the correspondence is associated with an email exchange, a text messaging exchange, an audio/video conference, an application sharing, and/or a desktop sharing, determine a list of local and cloud-based files of interest to the user, and present the list of the local and cloud-based files to the user for selection. The communication application may be further configured to attach one of the selected files or links to locations of the selected files to the correspondence upon selection of one or more files from the list, and if a locally stored file is selected as attachment, upload the selected file may be uploaded to the cloud and a link to a location of the uploaded file may be attached, else if a cloud-based file is selected as attachment, the selected file may be downloaded and the downloaded file may be attached to the correspondence based on a default rule or a user configuration.

In other examples, the local and cloud-based files may include locally stored files at a computing device associated with the user, files stored at a network drive associated with the user, files from a social network, files from a professional network, files from a collaboration service to which the user subscribes, and/or cloud-based files of other people. One or more recipients of the correspondence may be enabled to co-author the selected file upon accessing the selected file through the link to the location of the uploaded file within the cloud.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for treatment of cloud-based and local attachments in a communication application, the method comprising:

detecting a user intent to attach a file to a correspondence;

determining a list of local and cloud-based files of interest to the user, wherein the list of local and cloud-based files includes files locally stored at the user's computing device, files stored at the user's network drive, files from social or professional networks, files from a collaboration service to which the user subscribes, and cloud-based files of other people that are associated with the user;

presenting the list of the local and cloud-based files to the user for selection;

upon selection of a file from the list, attaching the selected file to the correspondence, wherein the attached file is the selected file or a link to a location of the selected file;

determining a permission associated with the attached file based on one or more of original permissions associated with the file or a user configuration, wherein the permission includes one or more of view, edit, forward, or save;

displaying an option to the user to modify the permission associated with the attached file;

enforcing the modified permission upon receipt of the correspondence with the attached file by a recipient; and in response to the recipient forwarding the correspondence with the attached file to one or more other recipients, displaying an option to the recipient to set a more restrictive permission than the modified permission associated with the attached file.

2. The method of claim 1, wherein determining the list of local and cloud-based files of interest to the user comprises determining files based on whether the user has recently viewed, modified, saved, listened to, shared, pinned, or sent the files.

3. The method of claim 1, further comprising:
one or more of ordering and grouping the list of local and cloud-based files based on whether the user has recently viewed, modified, saved, listened to, shared, pinned, or sent the files and one or more of a recentness of user interaction with a file, a type of user interaction with the file, and a type of the file.

4. The method of claim 1, further comprising:
one or more of ordering and grouping the list of local and cloud-based files based on one or more default rules, a user configuration, and an inference by the communication application.

5. The method of claim 1, further comprising:
displaying the attached file in one or more of an attachment well and a body of an email correspondence using one or more of a textual and a graphical scheme to represent the attached file.

6. The method of claim 1, further comprising:
determining the list of local and cloud-based files by receiving one or more lists of files from one or more application programming interfaces associated with one or more applications of the user.

7. The method of claim 1, further comprising:
if the attached file is the link to the location of the selected file, determining whether the recipient of the correspondence with the attached file has access to the location of the selected file through a pre-existing service subscription;
if the recipient has access, enabling the recipient to access the attached file using their own credentials associated with the pre-existing service subscription; and
if the recipient does not have access, creating a one-time guest access for the recipient.

8. The method of claim 1, further comprising:
if a locally stored file is the selected file, uploading the selected file to the cloud and attaching a link to a location of the uploaded file to the correspondence; and
if a cloud-based file is the selected file, downloading the selected file and attaching the downloaded file to the correspondence based on one of a default rule and a user configuration.

9. The method of claim 1, further comprising:
if a cloud-based file is the selected file, enabling a recipient's client application to retrieve a latest version of the file if the recipient is online or to use a sent version of the attachment if the recipient is off-line.

10. The method of claim 1, further comprising:
upon detecting insertion of a link to a cloud-based file within a body of an email correspondence by the user, automatically attaching the cloud-based file and displaying on a user experience as an attached file.

11. The method of claim 1, further comprising:
upon transmission of the correspondence to multiple recipients and one of the recipients forwarding to a group of recipients that includes at least one of the multiple recipients and at least one new recipient, enabling transmission of the forwarded correspondence with the attached file to the at least one new recipient and without the attached file to the at least one of the multiple recipients.

12. The method of claim 1, further comprising:
enabling a receiving client application that is capable of processing a link to a cloud-based file presented in an attachment well to present the link in one or both of the attachment well and a body of an email, and another receiving client that is not capable of processing the link to the cloud-based file presented in the attachment well to present the link as a link within the body of the email.

13. A computing device for treatment of cloud-based and local attachments in a communication application, the computing device comprising:
an input device;
a display device;
a memory configured to store instructions;
a processor coupled to the memory, wherein the processor, in conjunction with instructions stored in the memory, is configured to:
detect a user intent to attach a file to a correspondence through the input device;
determine a list of local and cloud-based files of interest to the user, wherein the list of local and cloud-based files includes files locally stored at the computing device, files stored at the user's network drive, files from social or professional networks, files from a collaboration service to which the user subscribes, and cloud-based files of other people that are associated with the user;
present the list of the local and cloud-based files to the user for selection through the display device; and
upon selection of a file from the list, attach the selected file to the correspondence, wherein the attached file is the selected file or a link to a location of the selected file and is displayed in one or more of an attachment well and a body of an email correspondence;
determine a permission associated with the attached file based on one or more of original permissions associated with the file or a user configuration, wherein the permission includes one or more of view, edit, forward, or save;

display an option to the user to modify the permission associated with the attached file;

enforce the modified permission upon receipt of the correspondence with the attached file by a recipient; and in response to the recipient forwarding the correspondence with the attached file to one or more other recipients, display an option to set a more restrictive permission than the modified permission associated with the attached file.

14. The computing device of claim 13, wherein the processor is configured to present the list of the local and cloud-based files to the user for selection through the display device by displaying one of a drop-down menu and a pop-up menu on a user experience.

15. The computing device of claim 14, wherein is the processor is further configured to display a browse selection through one of the drop-down menu and the pop-up menu on the user experience.

16. The computing device of claim 13, wherein the processor is further configured to:

treat the link to the location of the selected file as a local file such that the link is searchable within the list, wherein one or more of a graphical, a textual, a coloring, a shading, and a visual effect scheme is employed to distinguish between local and cloud-based files presented within the list, along with file types, file sources, and reasons for listing a file.

17. A system for treatment of cloud-based and local attachments in a communication application, the system comprising:

a first server configured to provide a communication service;

a second server configured to store files associated with users of the communication service; and a communication application executed on the first server, wherein the communication application is configured to:

detect a user intent to attach a file to a correspondence, wherein the correspondence is associated with one or more of an email exchange, a text messaging exchange, an audio/video conference, an application sharing, and a desktop sharing;

determine a list of local and cloud-based files of interest to the user, wherein the list of local and cloud-based files includes files locally stored at the user's computing device, files stored at the user's network drive, files from social or professional networks, files from a collaboration service to which the user subscribes, and cloud-based files of other people that are associated with the user;

present the list of the local and cloud-based files to the user for selection;

upon selection of a file from the list, attach the selected file to the correspondence, wherein:

the attached file is the selected file or a link to a location of the selected file;

if a locally stored file is the selected file the selected file is uploaded to the cloud and a link to a location of the uploaded file is attached to the correspondence; and if a cloud-based file is the selected file the selected file is downloaded and the downloaded file is attached to the correspondence based on one of a default rule and a user configuration;

determine a permission associated with the attached file based on one or more of original permissions associated with the file or a user configuration, wherein the permission includes one or more of view, edit, forward, or save;

display an option to the user to modify the permission associated with the attached file;

enforce the modified permission upon receipt of the correspondence with the attached file by a recipient; and in response to the recipient forwarding the correspondence with the attached file to one or more other recipients, display an option to set a more restrictive permission than the modified permission associated with the attached file.

18. The system of claim 17, wherein, if the locally stored file is the selected file, one or more recipients of the correspondence are enabled to co-author the selected file upon accessing the selected file through the link to the location of the uploaded file within the cloud.

* * * * *